United States Patent [19]

Stevenson

[11] 3,897,803
[45] Aug. 5, 1975

[54] PRESSURE CONTROL DEVICE

[76] Inventor: James S. Stevenson, 4230 St. Andrews Rd., Oakland, Calif. 94605

[22] Filed: July 23, 1973

[21] Appl. No.: 382,027

[52] U.S. Cl. ............. 137/524; 137/542; 137/DIG. 4
[51] Int. Cl. ........................................... F16k 15/06
[58] Field of Search....... 137/515.5, 516.11, 516.13, 137/530, 535, 540, 542, 538, 524, DIG. 4, 543 B, 529, 536; 251/DIG. 1, 320, 322, 323, 330, 349, 353, 354, 344; 267/153

[56] References Cited
UNITED STATES PATENTS

| | | | |
|---|---|---|---|
| 711,771 | 10/1902 | Keller | 251/349 X |
| 2,538,364 | 1/1951 | James et al. | 251/DIG. 1 |
| 2,716,424 | 8/1955 | Watts | 137/542 X |
| 2,726,678 | 12/1955 | Eyerly | 137/536 X |
| 2,731,981 | 1/1956 | Glasser | 137/543.13 X |
| 2,884,004 | 4/1959 | Dierdorf | 137/540 X |
| 2,910,998 | 11/1959 | Davis | 137/529 X |
| 3,075,538 | 1/1963 | Stafford | 251/344 X |
| 3,515,382 | 6/1970 | Gallagher | 267/153 X |
| 3,672,396 | 6/1972 | Pauliukonis | 137/512 |

FOREIGN PATENTS OR APPLICATIONS

| | | | |
|---|---|---|---|
| 1,011,376 | 11/1965 | United Kingdom | 137/535 |

*Primary Examiner*—William R. Cline

[57] ABSTRACT

A pressure control device in which an O-ring disposed about the stem of a valve, functions both as a seal for the stem and a spring for the valve. The regulator housing comprises mating threaded sections which may be adjusted to increase compression of the O-ring. Fittings are provided for attaching the regulator in a flow line.

6 Claims, 5 Drawing Figures

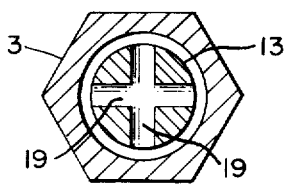
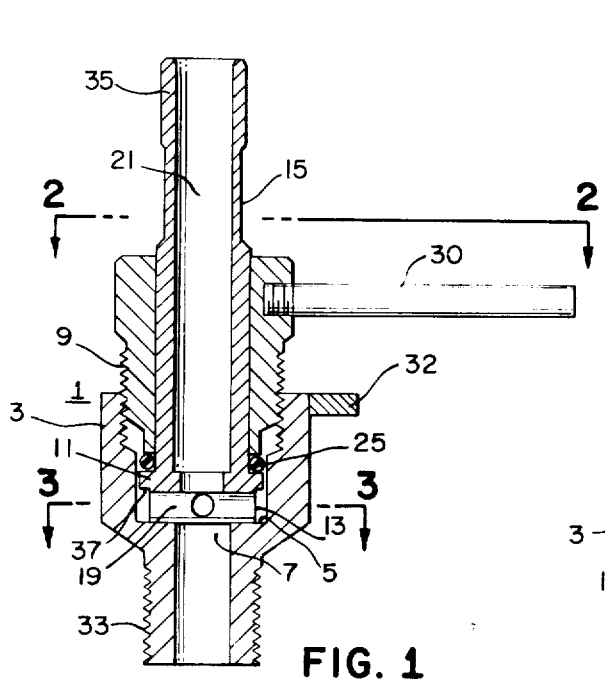
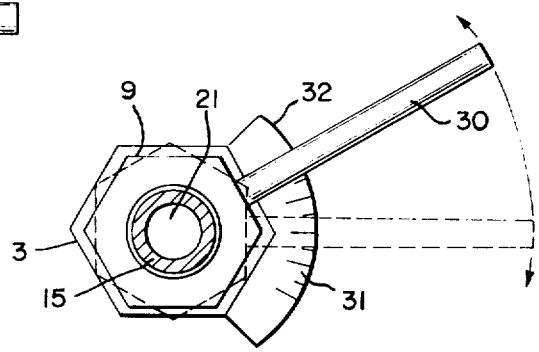
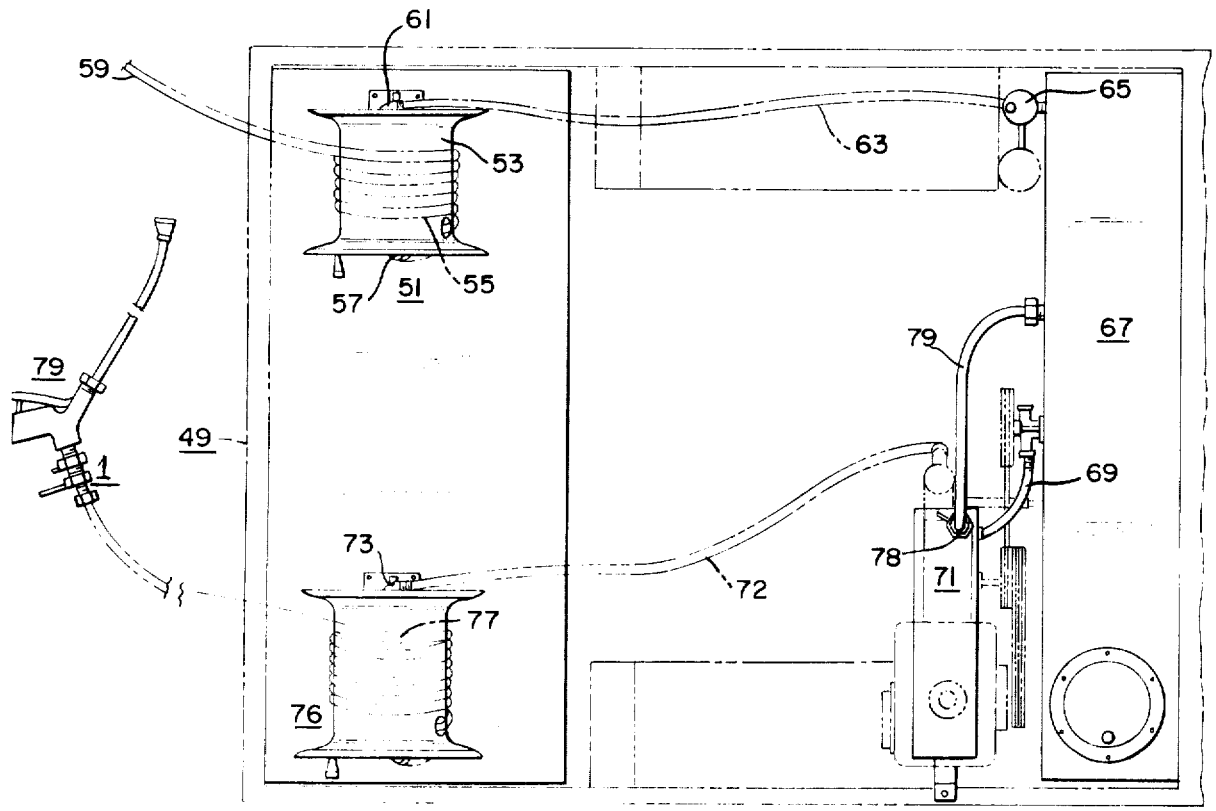

PRESSURE CONTROL DEVICE

My invention relates to pressure regulators and more particularly in relationship to use in spray and related equipment, and will be described in relationship to such equipment.

Pressure regulators heretofore employed in such equipment were relatively heavy, cumbersome and expensive, and served but the one purpose of controlling flow in a by-pass line, whereby to control pressure in a main line.

The present invention has for its objects;

1. To provide a novel and improved pressure regulator;

2. To provide a novel and improved pressure regulator which is small, of extremely light weight and inexpensive to produce;

3. To provide a novel and improved pressure regulator for use with pressures up to and exceeding 1000 pounds per square inch;

4. To provide a novel and improved pressure regulator wherein pressure adjustment may be effected manually over a wide range of pressures;

5. To provide a novel and improved pressure regulator capable, upon shut-down of a system, of relieving such system of residual pressure to enable a subsequent start-up under no-load condition;

6. To provide a novel and improved spray gun assembly enabling adjustment of pressure at the spray gun as distinguished from making adjustments at the spray rig.

Additional objects of my invention will be brought out in the following description of a preferred embodiment of the same, taken in conjunction with the accompanying drawings wherein FIG. 1 is a view in section through a pressure regulator of the present invention, adapted for installation in a spray rig system;

FIG. 2 is a view in section taken in the plane 2—2 of FIG. 1;

FIG. 3 is a view in section taken in the plane 3—3 of FIG. 1;

FIG. 5 is a view depicting a spray system installation, in which are depicted the employment of the pressure regulator of FIG. 1 and FIG. 4.

Figure 4:
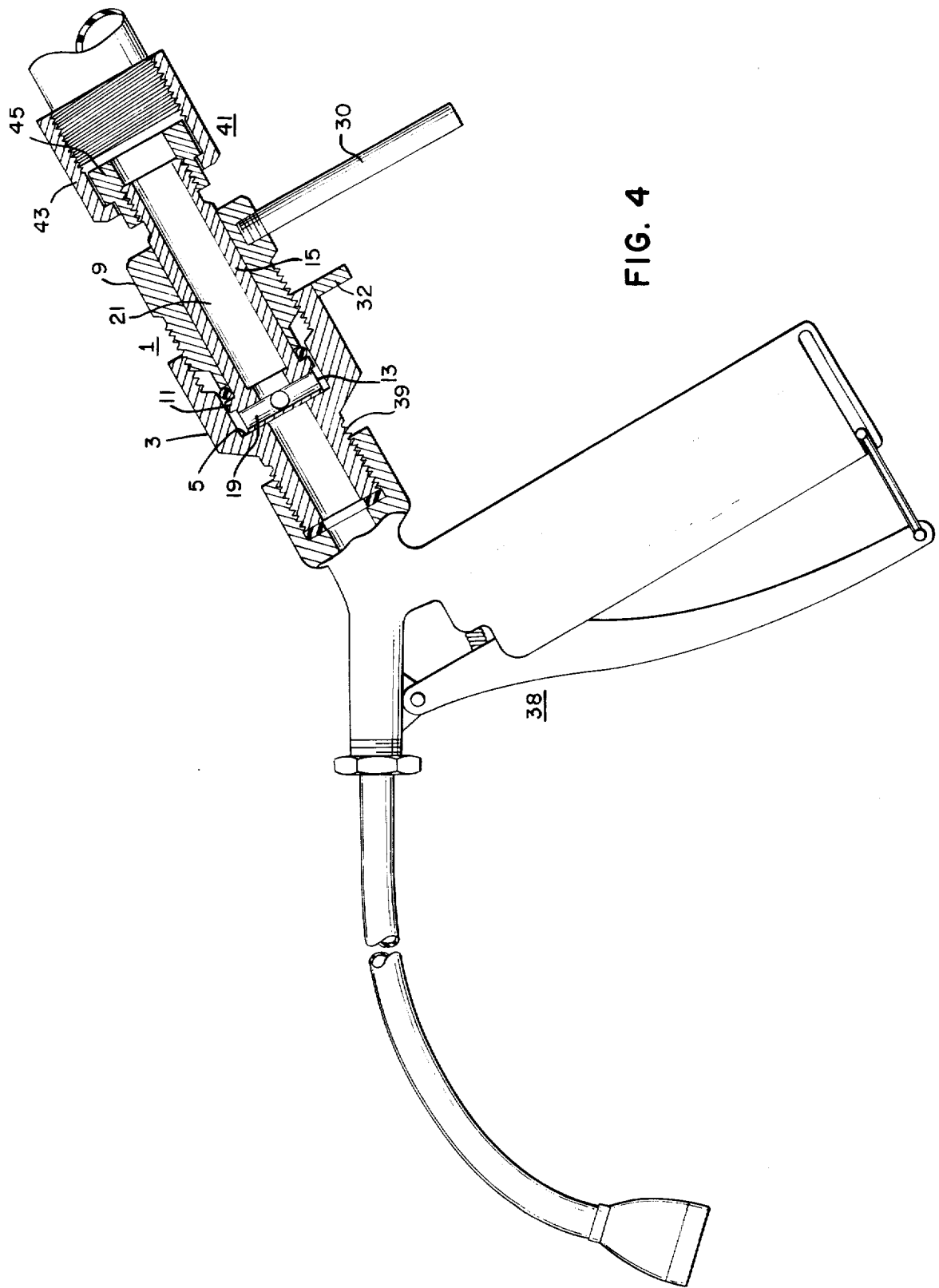
FIG. 4 is a view in section of a modification of the regulator of FIG. 1, adapted for assembly with a spray gun as shown.

The present invention is predicated on a discovery that an O-ring possesses a pressure range of resiliency, whereby it may function both as a seal and a spring in controlling operating pressures over such pressure range.

Referring to the drawings for a detailed description of my invention in its preferred form, for the manner in which such multiple function is made use of in a pressure regulator, the pressure regulator illustrated, basically involves a housing 1 formed of a hollow section 3 having a bottom wall 5 provided with an opening 7 therethrough, and a second section 9 adjustably threaded to the first section.

Within the housing is a loosely fitting piston 11 having a reduced portion 13 extending toward and adapted to span the opening in the bottom wall of the first section of the housing.

The piston is provided with a longitudinal extension 15 passing through and beyond the second section of the housing, the piston extension providing a sliding or loose fit therein.

In the reduced portion of the piston is at least one and preferably a plurality of radial passages 19 and these make flow connection with a longitudinal passage 21 through the piston extension, thus providing communication between the interior of the housing and a point exterior thereof.

Critical to the present invention is an O-ring 25 surrounding the piston extension and disposed between the piston and the proximate wall of the second section of the housing, in position to effect sealing with the proximate interior wall surfaces of the housing.

With the O-ring just barely contacting the second section of the housing, the piston preferably makes but light engagement with the wall area surrounding the opening 7 in the bottom wall of the first section of the housing, where it can function as a valve to respond to pressure of liquid against the seating end of the piston, the O-ring functioning as a spring in addition to its function as a seal, and giving way in response to such pressure.

Additional threading of the two housings sections together, will result in an increase in compression of the O-ring and a corresponding increase in seating pressure of the valve against its seat, thereby increasing the pressure of liquid required to move the piston off its seat to permit flow through the regulator.

To effect such adjustments manually, a handle 30 extending radially from one or the other of the housing sections, is provided, such handle offering the necessary leverage, whereby such adjustments may be realized with relatively little effort.

The total pressure range of the regulator, as determined between the initial light pressure contact with the O-ring and maximum compression of the same, is realized in about one quarter of a turn of one housing section with respect to the other. This manifests itself in a pressure range of from around zero to in excess of a thousand pounds per square inch, such range of pressure being well suitable for spray equipment.

Since spray pressures are not critical, a non-critical scale 31 carried on a quadrant 32 below the adjusting handle 30 and mounted on the opposite housing section, will enable rapid pressure adjustments.

For installation purposes, the one housing section may be formed with a threaded boss or fitting 33 surrounding the opening 7 while the exposed end of the piston extension may terminate in a head 35 for frictional attachment of a hose line.

While the foregoing device was described from the view point of applying liquid under pressure through the opening 7 against the proximate end of the piston 11, it will be apparent that if the pressure liquid were applied through the piston extension 15, a lift force will develop against the circular area 37 of the piston encircling the reduced section 13. Since this circular area could be made to greatly exceed the area exposed for lift purposes when the liquid under pressure is introduced through the opening 7, it might be of advantage in some installations, to introduce the pressure liquid through the piston extension. In any event, the flow through the regulator can be in either direction.

The embodiment illustrated in FIG. 1 is intended for installation as a pressure regulator in a by-pass line of a spray system, to control pressure in a main line of spray system.

The modification illustrated in FIG. 4 is intended for in-line installations, and more particularly for assembly with a spray gun 38 of the open-shut type. In this modification, in lieu of the threaded boss or fitting of the embodiment of FIG. 1, I provide this end of the housing with a male thread 39 adapted to fit a female fitting of the garden hose type, while at the other end of the regulator, the piston extension is threaded for installation thereon, of a female fitting 41 of the garden hose type, such fitting involving an internally threaded ring 43 rotatably retained at the end of the piston extension by a retaining nut 45 threaded to the extension.

In FIG. 5 of the drawings, I have illustrated a spray system such as forms the subject of my patent application for Spray Equipment And Method, Ser. No. 315,295, filed Dec. 15, 1972, now U.S. Pat. No. 3,856,274, in which system the present invention may be employed to great advantage. As illustrated, the spray system is of the mobile type, in that it is shown as installed in a small truck compartment or comparable mobile unit 49 and involving, in general, a hose reel assembly 51 installed at one rear corner of the truck compartment, such assembly including a reel 53 having a hose 55 installed thereon, with one end coupled to a hollow shaft 57, leaving the opposite end 59 of the hose free for connection to some external source of water supply.

At the opposite end of said hollow shaft, is a hose coupling fitting 61, for connection of a hose 63 from this point to a chemical ratio mixing device 65, the output of which connects to a storage tank 67 disposed transversely of the truck compartment adjacent the cab end thereof.

This tank is connected to the suction line 69 of a pump 71, which in turn discharges through a hose line 72 coupled to a hose fitting 73 at the end of a hollow shaft of hose reel assembly 76 similar to the hose reel assembly 51. A hose 77 stored on this hose reel assembly, is flow coupled to the opposite end of the hollow shaft, with its other end free for connection to a spray gun 79 such spray gun being of the conventional open-shut type as illustrated and designated by reference numerals 38 in FIG. 4.

Connecting the pump discharge to the tank in by-pass relationship to the discharge hose 72, is a flow connection including a pressure regulator 78, such as that of FIG. 1, installed in the pump housing on the discharge side of the pump, and a hose 79 from this regulator to the tank. When so installed, this pressure regulator may be adjusted to control maximum out-put pressure at the spray gun.

When designed for such installation, this particular embodiment, at its minimum pressure adjustment, should preferably not have a tight seating engagement between the piston valve and its seating area surrounding the opening 7. The advantage of this lies in the fact that upon shutting down the pump, the pressure regulator may be switched to its minimum pressure adjustment, whereby any residual pressure normally remaining in the pump, can then bleed off the tank. Thus upon starting up of the pump for a subsequent operation, the pump will not have to be started under load conditions.

The embodiment of my invention as illustrated in FIG. 4 is intended for in-line operation adjacent the spray gun at which location, it provides decided advantages over prior systems.

In spraying an area, it often becomes necessary to exercise caution to avoid spraying a particular tree or shrub. In prior situations of this kind, an operator would have to shut off his spray gun, walk back to the truck and adjust the regulator in the by-pass line, to reduce the pressure at the spray gun, so that the application of the spray could be better controlled in such areas where caution had to be exercised. Inasmuch as an operator may be working some hundred or two hundred feet from the truck, this necessitates a considerable waste of time, for each time such an adjustment has to be made, it necessitates two round trips, one round trip to lower the pressure and the next round trip to restore it back to its original value.

The embodiment of FIG. 4, provided as it is with a male hose fitting at one end and a female hose fitting at the other end, enables this regulator to be coupled directly to the spray gun, in the hose line to the gun, whereby, by a mere manual adjustment of the regulator control handle 30, the pressure may be reduced and restored on the spot, as and when necessary, thereby avoiding frequent trips back and forth to the truck, as was necessary with the equipment previously available.

From the foregoing description of my invention in its preferred form, it will be apparent that the same is subject to alteration and modification without departing from the underlying principles involved, and I accordingly do not desire to be limited in my protection to the specific details illustrated and described, except as may be necessitated by the appended claims.

I Claim:

1. A pressure control device comprising a housing having a plurality of walls, one of said walls having a valve opening therein for flow communication through said wall, a valve in said housing spanning said valve opening and having a stem passing through another wall of said housing facing said wall with the valve opening, said one wall and said another wall being mounted for longitudinal adjustment with respect to one another, said valve having an external shoulder and at least one substantially radial passage and said valve stem having a longitudinal passage flow-connecting with said substantially radial passage, said hollow stem terminating at its exposed end in means for coupling a hose thereto and an O-ring about said valve stem, between said valve shoulder and a surface of said other wall of said housing which faces said first wall, to function upon adjustment of said walls as a combined seal and spring to seal said stem and offer opposition to opening movement of said valve in response to application of fluid pressure to said valve.

2. A pressure control device in accordance with claim 1, characterized by said housing including a hollow section having a bottom comprising said one wall having the valve opening therein for flow communication therethrough, and another section threadable part way to said hollow section to provide said other wall of said housing.

3. A pressure control device in accordance with claim 1, characterized by said housing including a hollow section having a bottom comprising said one wall having the valve open therein for flow communication therethrough, and another section threadable part way to said hollow section to provide said other wall of said housing, one of said sections externally thereof carrying a male thread adapted to fit a conventional female fitting of the garden hose type, while said valve stem carries a female fitting of the garden hose type having a female thread.

4. A pressure control device in accordance with claim 2, characterized by means extending from the outer side of one of said housing sections for facilitating threading adjustment of one section with respect to the other in effecting compression adjustment of said O-ring, whereby to alter the pressure response of said device, and means for indicating the pressure response adjustment of said control device.

5. A pressure control device in accordance with claim 1, characterized by means for initially compressing said O-ring between said valve and said other wall in the absence of fluid pressure to said valve.

6. A pressure control device in accordance with claim 5, characterized by means for altering said initial compression of said O-ring whereby to alter the pressure response of said device.

* * * * *